UNITED STATES PATENT OFFICE.

WALTER ROBINSON, OF ONONDAGA, ASSIGNOR OF ONE-HALF TO SCHUYLER W. TERRY, OF SYRACUSE, NEW YORK.

PLASTERING COMPOSITION.

SPECIFICATION forming part of Letters Patent No. 434,569, dated August 19, 1890.

Application filed February 26, 1890. Serial No. 341,889. (No specimens.)

*To all whom it may concern:*

Be it known that I, WALTER ROBINSON, of Onondaga, in the county of Onondaga, in the State of New York, have invented new and useful Improvements in Plastering Compositions, of which the following is a full, clear, and exact description.

My invention relates to the composition of wall-plasters for architectural purposes, &c.

My object is to produce a composition of matter to be used for plastering walls and other architectural purposes cheap in composition and of great utility.

My invention consists in the several novel ingredients, hereinafter described, and specifically set forth in the claim annexed.

My invention consists in mixing and commingling sawdust, (having been previously saturated in a solution of lime-water, alum, white lead,) hair, sand, plaster-of-paris, and glue, with water in sufficient quantities to make it pliable. About twenty-four bushels of sawdust is first prepared by saturating it in a solution consisting of one-half bushel of quicklime, one ounce of pulverized alum, two pounds white lead, and about fifteen pails of water, after which the sawdust is allowed to dry in any ordinary and well-known manner.

The composition consists in mixing and commingling the above-named ingredients in substantially the following proportions: Sawdust, four bushels; sand, four bushels; plaster-of-paris, four bushels; white lead, two pounds; glue, eight ounces, and water in sufficient quantities to make the compound plastic. With this I may mix hair in any desired quantities.

What I claim, and desire to secure by Letters Patent, is—

The herein-described composition, consisting of sawdust, saturated with a solution of quicklime, alum, and white lead, with plaster-of-paris, glue, and sand, in substantially the proportions specified.

In witness whereof I have hereunto set my hand this 5th day of April, 1890.

WALTER ROBINSON.

Witnesses:
JOHN Y. TERRY,
F. FRANK DOLAN.